United States Patent
Son et al.

(10) Patent No.: US 12,023,900 B2
(45) Date of Patent: Jul. 2, 2024

(54) RECYCLABLE POLYETHYLENE-BASED LAMINATED PACKAGING MATERIAL WITH OPENABILITY AND METHOD OF MANUFACTURING THE SAME

(71) Applicants: SK Innovation Co., Ltd., Seoul (KR); SK Geo Centric Co., Ltd., Seoul (KR)

(72) Inventors: Jae Myoung Son, Daejeon (KR); Byoung Cheon Jo, Daejeon (KR); Joo Hyun Nam, Daejeon (KR); Eun Jung Baek, Daejeon (KR)

(73) Assignees: SK Innovation Co., Ltd., Seoul (KR); SK Geo Centric Co., Ltd., Seoul (KR)

( * ) Notice: Subject to any disclaimer, the term of this patent is extended or adjusted under 35 U.S.C. 154(b) by 0 days.

(21) Appl. No.: 18/353,922

(22) Filed: Jul. 18, 2023

(65) Prior Publication Data

US 2024/0034036 A1    Feb. 1, 2024

(30) Foreign Application Priority Data

Jul. 28, 2022    (KR) .................. 10-2022-0093700

(51) Int. Cl.
*B32B 27/32* (2006.01)
*B32B 27/08* (2006.01)

(52) U.S. Cl.
CPC ............ *B32B 27/32* (2013.01); *B32B 27/08* (2013.01); *B32B 2250/03* (2013.01); *B32B 2250/05* (2013.01); *B32B 2250/242* (2013.01); *B32B 2272/00* (2013.01); *B32B 2307/51* (2013.01); *B32B 2307/5825* (2013.01); *B32B 2307/7244* (2013.01); *B32B 2323/043* (2013.01); *B32B 2323/046* (2013.01); *B32B 2439/06* (2013.01); *B32B 2439/62* (2013.01); *B32B 2439/70* (2013.01)

(58) Field of Classification Search
None
See application file for complete search history.

(56) References Cited

U.S. PATENT DOCUMENTS

| | | |
|---|---|---|
| 2003/0054161 A1 | 3/2003 | Forte et al. |
| 2018/0370202 A1 | 12/2018 | Niedersuss et al. |
| 2019/0224952 A1 | 7/2019 | Clare |
| 2020/0122439 A1 | 4/2020 | Grefenstein et al. |
| 2021/0023828 A1 | 1/2021 | Yamada et al. |
| 2022/0024191 A1* | 1/2022 | Jones ................ B32B 27/34 |

FOREIGN PATENT DOCUMENTS

| | | |
|---|---|---|
| JP | 2005319583 A | 11/2005 |
| JP | 201655433 A | 4/2016 |
| JP | 2017149442 A | 8/2017 |
| JP | 2019522583 A | 8/2019 |
| JP | 2019189334 A | 10/2019 |
| JP | 202037189 A | 3/2020 |
| JP | 2020157514 A | 10/2020 |
| JP | 2020203405 A | 12/2020 |
| KR | 102261130 B1 | 6/2021 |

* cited by examiner

*Primary Examiner* — Sheeba Ahmed
(74) *Attorney, Agent, or Firm* — The Webb Law Firm

(57) ABSTRACT

The present disclosure relates to a recyclable polyethylene-based laminated packaging material with openability and a method of manufacturing the same including a multi-layered polyethylene film C in which a surface layer A and a sealant layer B are bonded to each other. The sealant layer B is a layer in which a polyolefin plastomer layer b1, a mixed resin layer b2 obtained by mixing a high-density polyethylene resin and a low-density polyethylene resin, and a composition layer b3 containing a resin composition obtained by mixing medium-density polyethylene and low-density polyethylene are sequentially laminated. Also disclosed is a method of manufacturing the same.

18 Claims, No Drawings

RECYCLABLE POLYETHYLENE-BASED LAMINATED PACKAGING MATERIAL WITH OPENABILITY AND METHOD OF MANUFACTURING THE SAME

CROSS-REFERENCE TO RELATED APPLICATION

This application claims priority to Korean Patent Application No. 10-2022-0093700 filed Jul. 28, 2022, the disclosure of which is hereby incorporated by reference in its entirety.

BACKGROUND OF THE INVENTION

Field of the Invention

The following disclosure relates to a recyclable polyethylene-based laminated packaging material with openability and a method of manufacturing the same.

Description of Related Art

Packaging materials have been mainly manufactured using a resin film formed of a resin material. Among them, a resin film formed of a polyolefin has been widely used as a packaging material because it has appropriate flexibility and excellent transparency.

The resin film formed of a polyolefin has been used by bonding resin films formed of polyester, polyamide, or the like that have more excellent mechanical and thermal properties, and the like, with a polyurethane-based adhesive, an acrylic adhesive, or the like. Accordingly, a common packaging material is manufactured using a laminated film in which a base material and a heat-seal layer are formed of heterogeneous materials. Therefore, in the case of the packaging material according to the related art, it is difficult to separate the heterogeneous resin materials, and thus, recycling is practically impossible, which has become a serious social problem in terms of the environment. As plastic decomposes by exposure to sunlight and heat, the plastic waste releases greenhouse gases such as methane and ethylene. Incineration of plastic waste releases significant amounts of greenhouse gases (GHG), such as carbon dioxide, nitrous oxide and/or methane, into the environment. Carbon dioxide is the primary greenhouse gas contributing to climate change. Therefore, it is desirable to provide a packaging material that is capable of being recycled to reduce waste and/or ameliorate the release of greenhouse gases into the environment by decomposition and/or incineration of packaging material.

In order to solve the problem, a technique for implementing a recyclable packaging material, in particular, a technique for implementing a packaging material using a resin film formed of only a polyolefin-based single material has been continuously developed. However, as described above, since mechanical properties of the polyolefin resin are inferior to those of a resin used as a base material in the related art, durability of a packaging material to be formed is deteriorated, such that defects are likely to occur in a printing process of the packaging material and the packaging material is easily damaged during use, such as when transported or stored. In addition, since heat resistance of the polyolefin resin is inferior to that of the resin used as a base material in the related art, defects are likely to occur in a heat-sealing process for forming a packaging material, such that heat-sealing properties may be deteriorated.

Therefore, a multi-layered film in which polyolefin resins having mechanical and thermal properties that are different from each other based on a density, an additive, a composition ratio, and the like are laminated in spite of using only a polyolefin-based single material, has been continuously developed. However, it is still difficult to obtain excellent mechanical and thermal properties, commercialization is not easy in terms of cost, and in particular, there is a limit to implementing a packaging material that may be used even at a low temperature. Therefore, improvement is required.

For example, Japanese Patent Laid-Open Publication No. 2020-037189 discloses a laminated film for a packaging material in which a content of a polyolefin is 80 parts by weight or more with respect to the entire film, but there is still a problem in that durability at a low temperature is deteriorated. Japanese Patent No. 6814287 discloses a recyclable polyethylene single material laminated film, but it is still difficult to obtain excellent heat resistance and heat-sealing properties are deteriorated.

Therefore, there is a demand for development of a novel film that may be easily recycled to solve environmental problems because it is a resin film formed of only a single material, has mechanical and thermal properties that are not significantly deteriorated in comparison to those of a laminated film formed of heterogeneous materials according to the related art, may be commercialized because excellent physical properties are maintained in various temperature ranges, and also has excellent processability, and a packaging material manufactured using the same.

In addition, a packaging material should have a tear strength that allows it to be easily opened by consumers. When the tear strength is too low, leakage of contents to the outside may occur due to cracks, tears, or the like of the packaging material, and when the tear strength is too high, it is difficult to open the packaging material.

In addition, in a case where a packaging material manufactured using a multi-layered polyethylene film is used at a low temperature, when an impact is applied due to vibration, dropping, and the like, leakage of contents to the outside frequently occurs due to cracks, tears, holes, or scratches generated in a surface area of the film.

Accordingly, there is a demand for a packaging material manufactured using a multi-layered polyethylene film that has excellent mechanical strength at a low temperature, and in particular, is easily opened by consumers since it has an appropriate tear strength.

RELATED ART DOCUMENT

Patent Documents (Patent Document 1) Japanese Patent Laid-Open Publication No. 2020-037189 (Mar. 12, 2020)
(Patent Document 2) Japanese Patent No. 6814287 (Dec. 22, 2020)

SUMMARY OF THE INVENTION

An embodiment of the present disclosure is directed to providing a multi-layered polyethylene film and a packaging material manufactured using the same that do not cause environmental pollution because they are recyclable and may minimize damage during processing and commercialization processes because mechanical and thermal properties are not significantly deteriorated in comparison to those of an existing laminated film formed of heterogeneous materials and a packaging material manufactured using the same.

Another embodiment of the present disclosure is directed to providing a packaging material that may prevent contents from leaking to the outside due to damage to the packaging material because it has a tear strength sufficient to allow it to be easily opened by consumers and also has excellent mechanical strength.

Still another embodiment of the present disclosure is directed to providing a multi-layered polyethylene film that is suitable for use in a molded article used at a low temperature, such an ice pack, a frozen food packaging bag, a frozen food container, a refrigerated food packaging bag, or a refrigerated food container, and a packaging material manufactured using the same.

Still another embodiment of the present disclosure is directed to providing a multi-layered polyethylene film that prevents damage or deterioration of physical properties of the film and implements significantly excellent heat-sealing properties and high-speed bag-making processability of the film even in a low temperature range, and a packaging material manufactured using the same.

In one general aspect, a multi-layered polyethylene film packaging material comprises a multi-layered polyethylene film C comprising a surface layer A and a sealant layer B bonded to each other, wherein the surface layer A comprises a single layer or multiple layers and comprises an outermost layer a1 having a melting point of 128° C. or higher, the sealant layer B comprises multiple layers and comprises an innermost layer having a melting point of 103° C. or lower, one layer of the sealant layer B is a layer in which a first film layer b1 comprising a polyethylene resin composition having a density of 0.900 to 0.940 g/cm$^3$, and a second film layer b2 comprising a polyethylene resin composition having a density of 0.925 to 0.970 g/cm$^3$ as another layer of the sealant layer B, and a third film layer b3 comprising a polyolefin resin as an innermost layer of the sealant layer B are laminated, an elongation at break of the surface layer A satisfies the following Expression 1, and a difference in melting point between the outermost layer a1 of the surface layer A and the innermost layer b3 of the sealant layer B satisfies the following Expression 2:

$$3 \leq \frac{\text{Elongation at break (\%) in machine direction } (MD)}{\text{Elongation at break (\%) in transverse direction } (TD)} \leq 80 \quad \text{[Expression 1]}$$

$$25°\text{ C.} \leq TA - TB \quad \text{[Expression 2]}$$

in Expression 1, each elongation at break is a value measured according to ASTM D-638-03, and in Expression 2, TA is the melting point of the outermost layer a1 of the surface layer A, and TB is the melting point of the innermost layer of the sealant layer B.

The surface layer A may comprise a layer comprising a first high-density polyethylene layer a1 as the outermost layer, a linear low-density polyethylene layer or medium-density polyethylene layer a2, and a second high-density polyethylene layer a3 are sequentially laminated.

In some embodiments, an elastic modulus value of the surface layer A may be 12,000 kg/cm$^2$ or more when measured in the MD by a 2% secant modulus method.

In some embodiments, a tear strength value of the surface layer A may be 3.0 g/μm or less in the MD, and a tear strength value of the sealant layer B may be 7.0 g/μm or less in the MD.

In some embodiments, a thickness of the surface layer A may be 1 to 100 μm.

In some embodiments, the surface layer A may further comprise one or more layers comprising one or more resin(s) of linear low-density polyethylene and medium-density polyethylene. In some embodiments, the resin(s) may have a melt index of 0.5 to 1.2 kg/10 min when measured at a load of 2.16 kg and 190° C. according to ASTM D1238.

One or more layers selected from the single layer and the multiple layers of the surface layer A may further comprise a low-density polyethylene resin(s).

One or more layers selected from the layers a1, a2, and a3 of the surface layer A may further comprise a low-density polyethylene resin(s).

Each layer of the surface layer A may further comprise 0 to 30 wt % of low-density polyethylene(s).

A thickness ratio of the first film layer b1, the second film layer b2, and the third film layer b3 in the sealant layer B may be 1:0.2 to 10:0.2 to 0.2 to 2.

The first film layer b1 may comprise 0 to less than 50 wt % of a low-density polyethylene resin(s).

The second film layer b2 may comprise 0 to less than 50 wt % of a low-density polyethylene resin(s).

In some examples, the multi-layered polyethylene film C may be laminated by a dry lamination method to layer B. In some examples, the layer B may be laminated by a dry lamination method to layer A.

In some examples, a total thickness of the film may be 30 to 300 μm.

The multi-layered polyethylene film packaging material may further comprise one or more blocking layer(s) between two or more of the layers of the surface layer A or on a surface of the surface layer A, or between two or more of the layers of the sealant layer B or on a surface of the sealant layer B.

The blocking layer may comprise an oxygen permeation blocking layer (s).

In some examples, the density of the first high-density polyethylene layer a1, the linear low-density polyethylene layer and/or medium-density polyethylene layer a2, and/or the second high-density polyethylene layer a3 may satisfy the following Expression 5:

$$1.00 \leq \frac{M1/M2}{M2/M3} \leq 1.20 \quad \text{[Expression 5]}$$

in Expression 5, $M_1$ is the density of the first high-density polyethylene layer a1, $M_2$ is the density of the linear low-density polyethylene layer and/or medium-density polyethylene layer a2, $M_3$ is the density of the second high-density polyethylene layer a3, the density is measured according to ASTM D792, and a unit of the density is g/cm$^3$.

In another general aspect, a molded article comprises the multi-layered polyethylene film packaging material.

The molded article may be selected from molded articles requiring openability in distribution and/or sales processes when packaging liquid/powder/solid contents.

The molded article may be one selected from an ice pack, a frozen food packaging bag, a frozen food container, a refrigerated food packaging bag, a refrigerated food container, a shrink film, a heavy weight packaging film, an automatic packaging film, a stretch wrap, and/or a bag.

Other features and aspects will be apparent from the following detailed description, the drawings, and the claims.

DESCRIPTION OF THE INVENTION

Hereinafter, a multi-layered polyethylene film packaging material according to the present disclosure will be described in detail.

Here, unless otherwise defined, all the technical terms and scientific terms have the same meanings as commonly understood by those skilled in the art to which the present disclosure pertains. The terms used in the description of the present disclosure are merely used to effectively describe a specific exemplary embodiment, but are not intended to limit the present disclosure.

In addition, unless otherwise stated in the specification, a unit of an additive may be wt %.

In addition, unless the context clearly indicates otherwise, the singular forms used in the specification and the scope of the appended claims are intended to include the plural forms.

Hereinafter, unless otherwise particularly defined in the present specification, the term "polymer" may refer to a polymerizable compound produced by polymerizing monomers. Specifically, the polymer may comprise a homopolymer, a copolymer, a terpolymer, an interpolymer, and the like. The "interpolymer" may refer to a polymer produced by polymerizing two or more different monomers. Therefore, the generic term "interpolymer" may comprise a copolymer and a terpolymer, for example. The copolymer refers to a polymer produced from two different monomers, and the terpolymer refers to a polymer produced from three different monomers.

Hereinafter, unless otherwise specifically defined in the present specification, it will be understood that when an element such as a layer, a film, a thin film, a region, or a plate, is referred to as being "above" or "on" another element, it may be "directly on" another element or may have an intervening element present therebetween.

The present disclosure may provide a packaging material that does not cause environmental pollution because it is recyclable using a polyethylene single material, and/or may minimize damage during processing and commercialization processes because mechanical and thermal properties are not significantly deteriorated in comparison to those of an existing laminated film formed of heterogeneous materials, and a packaging material manufactured using the same, and in particular, may prevent contents from leaking to the outside due to damage to the packaging material because it has a tear strength sufficient to allow it to be easily opened by consumers and/or also has excellent mechanical strength.

The present disclosure will be described in detail as follows.

The present disclosure provides a multi-layered polyethylene film packaging material comprises a multi-layered polyethylene film C comprising a surface layer A and a sealant layer B bonded to each other, wherein the surface layer A comprises a single layer or multiple layers and comprises the outermost layer a1 having a melting point of 128° C. or higher, the sealant layer B comprises multiple layers and comprises the innermost layer having a melting point of 103° C. or lower, one layer of the sealant layer B is a layer in which a first film layer b1 comprising a polyethylene resin composition having a density of 0.900 to 0.940 g/cm$^3$, a second film layer b2 comprising a polyethylene resin composition having a density of 0.925 to 0.970 g/cm$^3$ as another layer of the sealant layer B, and a third film layer b3 comprising a polyolefin resin as the innermost layer of the sealant layer B are laminated, an elongation at break of the surface layer A satisfies the following Expression 1, and a difference in melting point between the outermost layer a1 of the surface layer A and the innermost layer b3 of the sealant layer B satisfies the following Expression 2:

$$3 \leq \frac{\text{Elongation at break (\%)}}{\text{Elongation at break (\%)}} \leq 80 \quad [\text{Expression 1}]$$
$$\text{in transverse direction } (TD)$$

$$25° \text{C.} \leq TA - TB \quad [\text{Expression 2}]$$

in Expression 1, each elongation at break is a value measured according to ASTM D-638-03, and in Expression 2, TA is the melting point of the outermost layer a1 of the surface layer A, and TB is the melting point of the innermost layer of the sealant layer B.

As the surface layer A satisfies the above condition, the surface layer A may have mechanical strength similar to that of a resin according to the related art, such as nylon or polyethylene terephthalate (PET), and has excellent easy tear performance because the film is not easily stretched.

In some examples, the number of multiple layers of the surface layer A may be two or more, or three or more. In some examples, the surface layer A may have a structure comprising a layer comprising a first high-density polyethylene layer a1 as the outermost layer, a linear low-density polyethylene layer or medium-density polyethylene layer a2, and a second high-density polyethylene layer a3 sequentially laminated.

In a case where the surface layer A has the laminated structure, less breakage may occur during stretching than in the case of the single-layer structure.

The elongation at break may satisfy Expression 1, or may satisfy the following Expression 3, or may satisfy the following Expression 4, but is not limited thereto.

$$5 \leq \frac{\text{Elongation at break (\%) in } MD}{\text{Elongation at break (\%) in } TD} \leq 20 \quad [\text{Expression 3}]$$

$$5 \leq \frac{\text{Elongation at break (\%) in } MD}{\text{Elongation at break (\%) in } TD} \leq 15 \quad [\text{Expression 4}]$$

In Expressions 3 and 4, each elongation at break is a value measured according to ASTM D-638-03.

Also, unlike a heterogeneous composite film layer in which a polyethylene film and a PET or nylon film layer are mixed according to the related art, in the present disclosure, the surface layer A and the sealant layer B are formed of the same polyethylene resin, such that the multi-layered polyethylene film packaging material is easily recycled.

In addition, as a difference in melting point between the surface layer A and the sealant layer B satisfies the above range, high-speed bag-making processability may be implemented.

Hereinafter, the respective components will be described in detail.

[Surface Layer A]

In some examples, the surface layer A may comprise a single layer or multiple layers, or may have multiple layers, or may have two or more layers, or may have three or more layers. In some embodiments, the surface layer A may comprise or be a layer comprising a first high-density polyethylene layer a1 as the outermost layer, a linear low-density polyethylene layer or medium-density polyethylene layer a2, and a second high-density polyethylene layer a3, which are sequentially laminated.

The first high-density polyethylene layer a1 may comprise or be a layer comprising a high-density polyethylene resin. A non-limiting example of a suitable high-density polyethylene resin for first high-density polyethylene layer a1 is YUZEX 8300 high-density polyethylene resin, available from SKGC [density: 0.963 g/cm$^3$, melting point: 133° C., melt index: 0.7 g/10 min (190° C., 2.16 kg)].

In the linear low-density polyethylene layer or medium-density polyethylene layer a2, the linear low-density polyethylene layer may be a layer containing a linear low-density polyethylene resin, and the medium-density polyethylene layer may be a layer containing a medium-density polyethylene resin. A non-limiting example of a suitable linear low-density polyethylene resin for layer A2 is Smart 151 low-density polyethylene resin, available from SKGC [density: 0.915 g/cm$^3$, melting point: 114° C., melt index: 1.0 g/10 min (190° C., 2.16 kg)].

The second high-density polyethylene layer a3 may be a layer containing a high-density polyethylene resin. However, the present disclosure is not limited thereto. A non-limiting example of a suitable second high-density polyethylene resin for second high-density polyethylene layer a3 is YUZEX 8300 high-density polyethylene resin available from SKGC [density: 0.963 g/cm$^3$, melting point: 133° C., melt index: 0.7 g/10 min (190° C., 2.16 kg)].

The high-density polyethylene resin may comprise or be a resin having a density of 0.941 to 0.965 g/cm$^3$, and the linear low-density polyethylene resin may comprise or be a resin having a density of 0.910 to 0.925 g/cm$^3$.

In some examples, a thickness ratio of the first high-density polyethylene layer a1, the linear low-density polyethylene layer or medium-density polyethylene layer a2, and the second high-density polyethylene layer a3 in the surface layer A may be 1:0.1 to 10:0.1 to 2, or 1:0.2 to 0.7:0.5 to 1.5, or 1:0.3 to 0.6:0.8 to 1.2, but is not limited thereto.

As each layer of the surface layer A satisfies the above thickness range, the surface layer A may have excellent mechanical strength and a low tear strength, such that the multi-layered polyethylene film packaging material may be provided.

In some examples, a weight average molecular weight of the first high-density polyethylene resin may be 50,000 to 500,000 g/mol, or 100,000 to 300,000 g/mol, or 120,000 to 200,000 g/mol, but is not limited thereto.

A melt index of the first high-density polyethylene resin may be 0.1 to 10 g/10 min, or 0.3 to 5 g/10 min, or 0.5 to 1 g/10 min, but is not limited thereto.

In some examples, a weight average molecular weight of the linear low-density polyethylene resin may be 50,000 to 500,000 g/mol, or 70,000 to 200,000 g/mol, or 80,000 to 150,000 g/mol, but is not limited thereto.

In some examples, a melt index of the linear low-density polyethylene resin may be 0.1 to 10 g/10 min, or 0.3 to 5 g/10 min, or 0.5 to 3 g/10 min, but is not limited thereto.

In some examples, a weight average molecular weight of the second high-density polyethylene resin may be 50,000 to 500,000 g/mol, or 100,000 to 300,000 g/mol, or 120,000 to 200,000 g/mol, but is not limited thereto.

In some examples, a melt index of the second high-density polyethylene resin may be 0.1 to 10 g/10 min, or 0.3 to 5 g/10 min, or 0.5 to 3 g/10 min, but is not limited thereto.

As the first high-density polyethylene resin, the linear low-density polyethylene resin, and the second high-density polyethylene resin satisfy the above conditions, the surface layer A may have dimensional stability, heat resistance, and/or an ink adhesive force similar to those of a polymer resin, such as polyethylene terephthalate (PET) or nylon, which has been used for the surface layer A in the related art.

In some examples, an elastic modulus of the surface layer A is measured by a 2% secant modulus method, and may be 12,000 kg/cm$^2$ or more in the MD, or may be 13,000 kg/cm$^2$ or more in the MD and 8,000 kg/cm$^2$ or more in the TD, or may be 13,000 to 25,000 kg/cm$^2$ in the MD and 8,000 to 16,000 kg/cm$^2$ in the TD, or may be 14,000 to 16,000 kg/cm$^2$ in the TD, or may be 11,000 to 14,000 kg/cm$^2$ in the TD, but is not limited thereto. As the surface layer A satisfies the elastic modulus value in the above range, the packaging material may be opened by consumers with a moderate force without stretching the packaging material when opened.

In some examples, the surface layer A may be stretched by 3 times or more the original length in the MD, or may be stretched by 5 to 10 times the original length in the MD, or may be stretched by 5 to 8 times the original length in the MD, but is not limited thereto.

In some examples, the tear strength of the surface layer A may be 3.0 g/μm or less in the MD, or may be 0.5 g/μm or less in the TD and 3.0 g/μm or less in the MD. In some examples, the tear strength of the sealant layer B may be 10.0 g/μm or less in the TD and 7.0 g/μm or less in the MD, or the tear strength of the surface layer A may be 3.0 g/μm or less in the TD and 1.0 g/μm or less in the MD, or the tear strength of the sealant layer B may be 10.0 g/μm or less in the TD and 2.0 g/μm or less in the MD, but are not limited thereto.

As the surface layer A satisfies the tear strength value, the multi-layered polyethylene film C comprising the surface layer A and a sealant layer B described below are bonded to each other has excellent openability and has more excellent tensile strength and elongation at break.

In some examples, a thickness of the surface layer A may be 1 to 100 μm, or 5 to 70 μm, or 10 to 50 μm, but is not limited thereto.

As the thickness of the surface layer A satisfies the above range, the multi-layered polyethylene film comprising the surface layer A has excellent flexibility and excellent mechanical properties.

In some examples, the surface layer A may further comprise, but is not limited to, one or more layer(s) containing one or more resin(s) of linear low-density polyethylene and/or medium-density polyethylene. The low-density polyethylene and/or the medium-density polyethylene may have, but are not limited to, a melt index of 0.5 to 1.2 g/10 min, or 0.9 to 1.1 g/10 min, when measured at a load of 2.16 kg and 190° C. according to ASTM D1238.

In some examples, one or more layer(s) selected from the single layer and the multiple layers of the surface layer A may further comprise a low-density polyethylene resin, or one or more layers selected from the layers a1, a2, and a3 of the surface layer A may further comprise a low-density polyethylene resin, but the present disclosure is not limited thereto.

In some examples, the resin of each of the first high-density polyethylene layer a1, the linear low-density polyethylene layer or medium-density polyethylene layer a2, and the second high-density polyethylene layer a3 of the surface layer A may be a mixed resin further comprising a low-density polyethylene resin, but is not limited thereto.

In some examples, a content of the low-density polyethylene in each layer of the surface layer A may be 0 to 50 wt %, or 0 to 30 wt %, but is not limited thereto.

[Sealant Layer (B)]

The sealant layer B comprised in the multi-layered polyethylene film C may have multiple layers, and a melting point of the innermost layer of the sealant layer B may be 103° C. or lower.

One layer of the sealant layer B is a layer in which a first film layer b1 comprising a polyethylene resin composition having a density of 0.900 to 0.940 g/cm$^3$, a second film layer b2 comprising a polyethylene resin composition having a density of 0.930 to 0.970 g/cm$^3$ as another one layer of the sealant layer B, and a third film layer b3 comprising a polyolefin resin as the innermost layer of the sealant layer B are laminated.

In some examples, the first film layer b1, the second film layer b2, and the third film layer b3 may be sequentially laminated, the first film layer b1 may comprise a mixed resin obtained by mixing medium-density polyethylene and low-density polyethylene, and the second film layer b2 may comprise a mixed resin obtained by mixing high-density polyethylene and low-density polyethylene. Also, the third film layer b3 may comprise a polyolefin-based resin, or may contain a polyolefin plastomer.

For example, the first film layer b1 may be prepared from a resin composition [average density: 0.9305 g/cm$^3$] obtained by mixing 70 wt % of a medium-density polyethylene resin, such as FN800M medium-density polyethylene resin, available from SKGC [density: 0.935 g/cm$^3$, melting point: 127° C., melt index: 1.0 g/10 min (190° C., 2.16 kg)] and 30 wt % of a low-density polyethylene resin, such as SEETEC BS500, available from LGCHEM [density: 0.918 to 0.921 g/cm$^3$, melting point: 113° C., melt index: 3.1 to 3.5 g/10 min (190° C., 2.16 kg)].

For example, the second film layer b2 may be prepared from a resin composition [average density: 0.9445 g/cm$^3$] obtained by mixing 70 wt % of a high-density polyethylene resin, such as YUZEX 3301 high-density polyethylene resin, available from SKGC [density: 0.955 g/cm$^3$, melting point: 131° C., melt index: 0.8 g/10 min (190° C., 2.16 kg)] and 30 wt % of a low-density polyethylene resin, such as SEETEC BS500, available from LGCHEM [density: 0.918 to 0.921 g/cm$^3$, melting point: 113° C., melt index: 3.1 to 3.5 g/10 min (190° C., 2.16 kg)].

For example the third film layer b3, may be prepared from a polyolefin plastomer), such as Supreme 891, available from SKGC [density: 0.885 g/cm$^3$, melting point: 74° C., melt index: 1.0 g/10 min (190° C., 2.16 kg].

In some examples, as a difference in melting point between the outermost layer of the surface layer A and the innermost layer of the sealant layer B satisfies the range of Expression 2, the multi-layered polyethylene film C according to the present disclosure may be subjected to a heat-sealing process even in a sufficiently low temperature range without damaging the surface layer A or deteriorating physical properties of the surface layer A.

According to the present disclosure, even when the surface layer A has a relatively low melting point compared to polyester, polyamide, and the like, which have been mainly used in the heterogeneous material laminated film according to the related art, the film is not damaged or the physical properties thereof are not deteriorated, and excellent heat-sealability and high-speed bag-making processability of the film may be implemented.

In particular, in a case where the high-speed bag-making processability is deteriorated, this leads to an increase in unit price of the packaging material to be manufactured, and thus, productivity and cost-effectiveness of the film and the packaging material are significantly deteriorated. In the multi-layered polyethylene film C according to the present disclosure, it is possible to improve the bag-making processability of the film and to obtain the cost-effectiveness accordingly by maintaining a large difference in melting point between the surface layer A and the sealant layer B.

In some examples, in the present disclosure, a melting point of the sealant layer B may be 160° C. or lower, or 140° C. or lower, or 40 to 130° C., or 50 to 120° C., but is not limited thereto.

In some examples, in an aspect of the present disclosure, a heat-sealing initiation temperature for heat-sealing the sealant layer B may be 40 to 140° C., or 50 to 110° C., or 50 to 100° C., but is not limited thereto.

In this case, the heat-sealing initiation temperature refers to a temperature when a seal strength of the sealant layer B is 1,000 gf or more when measured according to ASTM F2029 and ASTM F88.

As the melting point and the heat-sealing initiation temperature of the sealant layer B satisfy the above ranges, in the multi-layered polyethylene film and the packaging material manufactured using the same according to the present disclosure, heat-sealing properties and high-speed bag-making processability of the film may be more significantly implemented even in a sufficiently low temperature range without damaging the surface layer A or deteriorating physical properties of the surface layer A.

In some examples, a content of the low-density polyethylene resin in the first film layer b1 may be less than 50%, or 40% or less, or 0 to 30 wt %, but is not limited thereto.

In some examples, a content of the low-density polyethylene resin in the second film layer b2 may be less than 50%, or 40% or less, or 0 to 30 wt %, but is not limited thereto.

As the contents of the low-density polyethylene resins in the first film layer b1 and the second film layer b2 satisfy the above ranges, the multi-layered polyethylene film C may have a low tear strength sufficient to allow it to be easily opened by consumers.

In some examples, the sealant layer B may further have an additional linear low-density polyethylene resin layer at a bottom of the second film layer b2. As the linear low-density polyethylene resin layer is further comprised at the bottom of the second film layer b2, the sealant layer B may have more excellent mechanical strength and seal strength.

In some examples, the multi-layered polyethylene film C, the surface layer A, and the sealant layer B may be laminated by application of an adhesive or a lamination method, specifically, may be laminated by a lamination method, and more specifically, may be laminated by a dry lamination method, but the present disclosure is not limited thereto.

According to the present disclosure, a thickness ratio of the first film layer b1, the second film layer b2, and the third film layer b3 in the sealant layer B may be 1:0.2 to 10:0.2 to 2, but is not limited thereto.

In some examples, a total thickness of the film may be 30 to 300 μm, specifically, may be 70 to 250 μm, and more specifically, may be 100 to 200 μm, but is not limited thereto.

In some examples, one or more blocking layers may be further comprised between the layers of the surface layer A or on a surface of the surface layer A, or between the layers of the sealant layer B or on a surface of the sealant layer B.

The blocking layer may comprise an ultraviolet blocking layer, a visible light blocking layer, an oxygen permeation blocking layer, and a moisture blocking layer, and specifically, may comprise an oxygen permeation blocking layer, but the present disclosure is not limited thereto.

A material of the oxygen permeation blocking layer may be one or a mixture selected from an ethylene vinyl alcohol copolymer, a polylactic acid copolymer, and a polyhydroxybutyrate copolymer, and specifically, may contain an ethylene vinyl alcohol copolymer, but is not limited thereto.

In some examples, in the multi-layered polyethylene film packaging material, densities of the first high-density polyethylene layer a1, the linear low-density polyethylene layer or medium-density polyethylene layer a2, and the second high-density polyethylene layer a3 may satisfy the following Expression $$1.00 \leq \frac{M1/M2}{M2/M3} \leq 1.20 \qquad \text{[Expression 5]}$$

in Expression 5, $M_1$ is the density of the first high-density polyethylene layer a1, $M_2$ is the density of the linear low-density polyethylene layer or medium-density polyethylene layer a2, $M_3$ is the density of the second high-density polyethylene layer a3, the density is measured according to ASTM D792, and a unit of the density is g/cm$^3$.

As the densities of the layers of the surface layer A satisfy Expression 5, the surface layer A has mechanical strength similar to that of a resin such as nylon or PET according to the related art, and accordingly, the same polyethylene resin as that of the sealant layer B is used, such that the multi-layered polyethylene film packaging material is easily recyclable.

In some examples, a tear strength of the multi-layered polyethylene film packaging material may be 3.0 g/μm or less in the MD and 3.0 g/μm or less in the TD, or 0.1 to 3.0 g/μm in the MD and 0.1 to 3.0 g/μm in the TD, or 0.3 to 2.0 g/μm in the MD and 0.5 to 3.0 g/μm in the TD, but is not limited thereto.

Another aspect of the present disclosure may provide a packaging material manufactured using the multi-layered polyethylene film and a molded article comprising the same.

The molded article may be selected from molded articles requiring openability in distribution and/or sales processes when packaging liquid/powder/solid contents, and non-limiting examples of the molded article comprise an ice pack, a frozen food packaging bag, a frozen food container, a refrigerated food packaging bag, a refrigerated food container, a shrink film, a heavy weight packaging film, an automatic packaging film, a stretch wrap, and/or a bag.

The packaging material according to the present disclosure may maintain excellent durability and mechanical properties in a wide temperature range comprising a low temperature in spite of a continuous temperature change in a manufacturing process at room temperature, a heat-sealing process at a high temperature, and/or distribution and storage processes at a low temperature. Therefore, it is more preferable that the packaging material is applied to a molded article used at a low temperature, such as an ice pack, a frozen food packaging bag, a frozen food container, a refrigerated food packaging bag, or a refrigerated food container, in consideration of the effects according to the present disclosure, but it is a non-limiting example, and the present disclosure is not limited thereto.

A recyclable multi-layered polyethylene film packaging material could be prepared by lamination or co-extrusion but the method is not limited as above Also, there is provided herein a method for reducing greenhouse gas emissions from a multi-layered polyethylene film packaging material, comprising: preparing a recyclable multi-layered polyethylene film packaging material comprising a multi-layered polyethylene film C comprising a surface layer A and a sealant layer B which are bonded to each other, wherein the surface layer A comprises a single layer or multiple layers and an outermost layer a1 having a melting point of 128° C. or higher, the sealant layer B comprises multiple layers and an innermost layer having a melting point of 103° C. or lower, one layer of the sealant layer B is a layer in which a first film layer b1 comprises a polyethylene resin composition having a density of 0.900 to 0.940 g/cm$^3$, a second film layer b2 comprises a polyethylene resin composition having a density of 0.925 to 0.970 g/cm$^3$ as another layer of the sealant layer B, and a third film layer b3 comprising a polyolefin resin as the innermost layer of the sealant layer B are laminated, an elongation at break of the surface layer A satisfies the following Expression 1, and a difference in melting point between the outermost layer a1 of the surface layer A and the innermost layer b3 of the sealant layer B satisfies the following Expression 2:

$$3 \leq \frac{\text{Elongation at break (\%)}}{\text{Elongation at break (\%)}} \leq 80 \qquad \text{[Expression 1]}$$
$$\text{in machine direction } (MD)$$
$$\text{in transverse direction } (TD)$$

$$25° C. \leq TA - TB \qquad \text{[Expression 2]}$$

in Expression 1, each elongation at break is a value measured according to ASTM D-638-03, and in Expression 2, TA is the melting point of the outermost layer a1 of the surface layer A, and TB is the melting point of the innermost layer of the sealant layer B.

Hereinafter, the present disclosure will be described in more detail with reference to Examples and Comparative Examples. However, the following Examples and Comparative Examples are only examples for describing the present disclosure in more detail, and the present disclosure is not limited by the following Examples and Comparative Examples.

[Physical Property Measurement Methods]

(1) Density

A density was measured using a replacement method according to ASTM D792.

(2) Melt Index

A melt index was measured at a load of 2.16 kg and 190° C. according to ASTM D1238.

(3) Tear Strength

A tear strength was measured according to KS M ISO 1974 with an Elmendorf type measuring instrument (manufactured by Toyo Seiki Seisaku-sho, Ltd.).

(4) Tensile Strength

A tensile strength was measured according to ASTM D882.

(5) Elongation at Break

An elongation at break was measured according to ASTM D-638-03.

(6) Elastic Modulus

An elastic modulus was measured by a 2% secant modulus method, and specifically, an elastic modulus in a machine direction (MD) and a transverse direction (TD) was measured according to ASTM D882.

(7) Haze

A haze was measured according to ASTM D1003.

[Manufacturing of Surface Layer A Film]

Manufacturing Example A-1

A first high-density polyethylene resin [density: 0.963 g/cm$^3$, melting point: 133° C., melt index: 0.7 g/10 min (190° C., 2.16 kg), YUZEX 8300, SKGC] was used for a first high-density polyethylene layer a1, a linear low-density polyethylene resin [density: 0.915 g/cm³, melting point: 114° C., melt index: 1.0 g/10 min (190° C., 2.16 kg), Smart 151, SKGC] was used for a linear low-density polyethylene layer a2, and a second high-density polyethylene resin [density: 0.963 g/cm³, melting point: 133° C., melt index: 0.7 g/10 min (190° C., 2.16 kg), YUZEX 8300, SKGC] was used as a second high-density polyethylene layer a3. At this time, a surface layer A film having a three-layer structure including layers a1/a2/a3 was formed by co-extruding the above resins by blown film molding while controlling a processing temperature for each layer from 165° C. to 195° C. using a total of three extruders having a screw size of 24 pi while performing filtering so that the unmelted resin did not pass through the extruders.

At this time, a die diameter was set to 50 mm, a die gap was set to 0.7 mm, a bubble expansion ratio at the time of manufacturing the film was set to 2.6:1, and a height of a cooling wire cooled by air was set to 12 cm based on the die. The cooled and solidified film was pulled by a nip roller and was wound into a film roll. Thicknesses and the total thickness of the layers of the film were 8.3 μm/8.3 μm/8.3 μm (total 25 μm), and a stretch ratio of the film in the MD was 6 times the original length.

The physical properties of the obtained surface layer A film are shown in Table 1.

Manufacturing Example A-2

A surface layer A film was manufactured in the same manner as that of Manufacturing Example A-1, except that thicknesses and the total thickness of the layers of the film were 8.3 μm/8.3 μm/8.3 μm (total 25 μm), and a stretch ratio of the film in the MD was 7 times the original length. The physical properties of the manufactured surface layer A film are shown in Table 1.

Manufacturing Example A-3

A surface layer A film was manufactured in the same manner as that of Manufacturing Example A-1, except that thicknesses and the total thickness of the layers of the film were 10 μm/5 μm/10 μm (total 25 μm), and a stretch ratio of the film in the MD was 6 times the original length. The physical properties of the manufactured surface layer A film are shown in Table 1.

Manufacturing Example A-4

A surface layer A film was manufactured in the same manner as that of Manufacturing Example A-1, except that thicknesses and the total thickness of the layers of the film were 10 μm/5 μm/10 μm (total 25 μm), and a stretch ratio of the film in the MD was 7 times the original length. The physical properties of the manufactured surface layer A film are shown in Table 1.

Manufacturing Example A-5

A surface layer A film was manufactured in the same manner as that of Manufacturing Example A-1, except that thicknesses and the total thickness of the layers of the film were 10.43 μm/4.17 μm/10.43 μm (total 25 μm), and a stretch ratio of the film in the MD was 6 times the original length. The physical properties of the manufactured surface layer A film are shown in Table 1.

Manufacturing Example A-6

A surface layer A film was manufactured in the same manner as that of Manufacturing Example A-1, except that thicknesses and the total thickness of the layers of the film were 6.25 μm/12.5 μm/6.25 μm (total 25 μm), and a stretch ratio of the film in the MD was 6 times the original length. The physical properties of the manufactured surface layer A film are shown in Table 1.

Manufacturing Example A-7

A surface layer A film was manufactured in the same manner as that of Manufacturing Example A-1, except that thicknesses and the total thickness of the layers of the film were 6.25 μm/12.5 μm/6.25 μm (total 25 μm), and a stretch ratio of the film in the MD was 7 times the original length. The physical properties of the manufactured surface layer A film are shown in Table 1.

Manufacturing Example A-8

A multi-layered polyethylene film was manufactured in the same manner as that of Example 1, except that the surface layer A film was configured to include only a single layer a1 (thickness: 25 μm, stretch ratio: 6.2) instead of the three layers.

The physical properties of the obtained surface layer A film are shown in Table 2. The physical properties of the obtained sealant layer B film are shown in Table 2. The physical properties of the obtained polyethylene film are shown in Table 3.

Manufacturing Example A-9

A multi-layered polyethylene film was manufactured in the same manner as that of Example 1.

Thicknesses and the total thickness of the layers of the film were 8.3 μm/8.3 μm/8.3 μm (total 25 μm), and a stretch ratio of the film in the MD was 1 times the original length.

The physical properties of the obtained surface layer A film are shown in Table 1.

[Manufacturing of Sealant Layer B Film]

Manufacturing Example B-1

A resin composition [average density: 0.9305 g/cm³] obtained by mixing 70 wt % of a medium-density polyethylene resin [density: 0.935 g/cm³, melting point: 127° C., melt index: 1.0 g/10 min (190° C., 2.16 kg), FN800M, SKGC] and 30 wt % of a low-density polyethylene resin [density: 0.918 to 0.921 g/cm³, melting point: 113° C., melt index: 3.1 to 3.5 g/10 min (190° C., 2.16 kg), SEETEC BS500, LGCHEM] was used for a first film layer b1.

A resin composition [average density: 0.9445 g/cm³] obtained by mixing 70 wt % of a high-density polyethylene resin [density: 0.955 g/cm³, melting point: 131° C., melt index: 0.8 g/10 min (190° C., 2.16 kg), YUZEX 3301, SKGC] and 30 wt % of a low-density polyethylene resin [density: 0.918 to 0.921 g/cm³, melting point: 113° C., melt index: 3.1 to 3.5 g/10 min (190° C., 2.16 kg), SEETEC BS500, LGCHEM] was used for a second film layer b2.

A polyolefin plastomer [density: 0.885 g/cm³, melting point: 74° C., melt index: 1.0 g/10 min (190° C., 2.16 kg), Supreme 891, SKGC] was used for a third film layer b3. At this time, a multi-layered sealant layer B film comprising three layers b1/b2/b3 was formed by co-extruding the above resins by blown film molding while controlling the processing temperature for each layer from 165° C. to 195° C. using a total of three extruders having a screw size of 24 pie while performing filtering so that unmelted resin did not pass through the extruders.

At this time, a die diameter was set to 50 mm, a die gap was set to 0.7 mm, a bubble expansion ratio at the time of manufacturing the film was set to 2.6:1, and a height of a cooling wire cooled by air was set to 12 cm based on the die. The cooled and solidified film was pulled by a nip roller and was wound into a film roll. Thicknesses and the total thickness of the layers of the film were 23.3 μm/34.8 μm/11.6 μm (total 70 μm).

The physical properties of the obtained sealant layer B film are shown in Table 2.

Manufacturing Example B-2

A sealant layer B film was manufactured in the same manner as that of Manufacturing Example B-1, except that a high-density polyethylene resin [density: 0.955 g/cm$^3$, melting point: 131° C., melt index: 0.8 g/10 min (190° C., 2.16 kg), YUZEX 3301, SKGC] was used for a first film layer b1, a medium-density polyethylene resin [density: 0.935 g/cm$^3$, melting point: 127° C., melt index: 1.0 g/10 min (190° C., 2.16 kg), FN800M, SKGC] was used for a second film layer b2, and a polyolefin plastomer resin [density: 0.885 g/cm$^3$, melting point: 74° C., melt index: 1.0 g/10 min (190° C., 2.16 kg), Supreme 891, SKGC] was used for a third film layer b3. Thicknesses and the total thickness of the layers of the sealant layer B film were 17.5 μm/35 μm/17.5 μm (total 70 μm).

The physical properties of the obtained sealant layer B film are shown in Table 2.

Manufacturing Example B-3

A sealant layer B film having a thickness of 70 μm was manufactured using a linear low-density polyethylene resin [density: 0.915 g/cm$^3$, melting point: 114° C., melt index: 1.0 g/10 min (190° C., 2.16 kg), Smart 151, SKGC].

Manufacturing Example B-4

A sealant layer B film having a thickness of 70 μm was manufactured using a polyolefin plastomer resin [density: 0.885 g/cm$^3$, melting point: 74° C., melt index: 1.0 g/10 min (190° C., 2.16 kg), Supreme 891, SKGC].

Manufacturing Example B-5

A sealant layer B film having a thickness of 70 μm was manufactured using a high-density polyethylene resin [density: 0.955 g/cm$^3$, melting point: 131° C., melt index: 0.8 g/10 min (190° C., 2.16 kg), YUZEX 3301, SKGC].

Manufacturing Example B-6

A sealant layer B film was manufactured in the same manner as that of Manufacturing Example B-1, except that a linear low-density polyethylene resin [density: 0.915 g/cm$^3$, melting point: 114° C., melt index: 1.0 g/10 min (190° C., 2.16 kg), Smart 151S, SKGC] was used for a composition layer b1, a high-density polyethylene resin [density: 0.955 g/cm$^3$, melting point: 131° C., melt index: 0.8 g/10 min (190° C., 2.16 kg), YUZEX 3301, SKGC] was used for a mixed resin layer b2, and a linear low-density polyethylene resin [density: 0.915 g/cm$^3$, melting point: 114° C., melt index: 1.0 g/10 min (190° C., 2.16 kg), Smart 151S, SKGC] was used for a polyolefin plastomer layer b3. Thicknesses and the total thickness of the layers of the sealant layer B film were 17.5 μm/35 μm/17.5 μm (total 70 μm).

The physical properties of the obtained sealant layer B film are shown in Table 2.

Manufacturing Example B-7

A sealant layer B film having a thickness of 70 μm was manufactured using a resin composition obtained by mixing 70 wt % of a high-density polyethylene resin [density: 0.955 g/cm$^3$, melting point: 131° C., melt index: 0.8 g/10 min (190° C., 2.16 kg), YUZEX 3301, SKGC] and 30 wt % of a linear low-density polyethylene resin [density: 0.915 g/cm$^3$, melting point: 114° C., melt index: 1.0 g/10 min (190° C., 2.16 kg), Smart 151, SKGC].

Example 1

A multi-layered polyethylene film packaging material was manufactured by laminating the surface layer A (Manufacturing Example A-4) and the sealant layer B (Manufacturing Example B-1). A surface of the layer a3 of the surface layer A and a surface of the layer b1 of the sealant layer B were laminated, the laminate was charged into a dry lamination machine, and then heat-sealing was performed at 150° C., thereby manufacturing a multi-layered polyethylene film packaging material.

The physical properties of the multi-layered polyethylene film packaging material are shown in Table 3.

Example 2

A multi-layered polyethylene film packaging material was manufactured in the same manner as that of Example 1 except for using B-2 instead of B-1 of the sealant layer B film.

The physical properties of the multi-layered polyethylene film packaging material are shown in Table 3.

Example 3

A multi-layered polyethylene film packaging material was manufactured in the same manner as that of Example 1 except for using A-8 instead of A-4 of the surface layer A film.

The physical properties of the multi-layered polyethylene film packaging material are shown in Table 3.

Comparative Example 1

A multi-layered polyethylene film packaging material was manufactured in the same manner as that of Example 1 except for using B-6 instead of B-1 of the sealant layer B film.

The physical properties of the multi-layered polyethylene film packaging material are shown in Table 3.

Comparative Example 2

A multi-layered polyethylene film packaging material was manufactured in the same manner as that of Example 1 except for using A-6 instead of A-4 of the surface layer A film.

The physical properties of the multi-layered polyethylene film packaging material are shown in Table 3.

Comparative Example 3

A multi-layered polyethylene film packaging material was manufactured in the same manner as that of Example 1 except for using A-7 instead of A-4 of the surface layer A film.

Comparative Example 4

A multi-layered polyethylene film packaging material was manufactured in the same manner as that of Example 1, except that the surface layer A film was configured to include only a nylon layer (25 μm, NY film, JK Materials Co., Ltd.) instead of the three layers.

The physical properties of the obtained surface layer A film are shown in Table 2. The physical properties of the obtained sealant layer B film are shown in Table 2. The physical properties of the obtained polyethylene film packaging material are shown in Table 3.

Comparative Example 5

A multi-layered polyethylene film packaging material was manufactured in the same manner as that of Example 1 except for using B-5 instead of B-1 of the sealant layer B film.

The physical properties of the multi-layered polyethylene film packaging material are shown in Table 3.

Comparative Example 6

A multi-layered polyethylene film packaging material was manufactured in the same manner as that of Example 1 except for using A-9 instead of A-4 of the surface layer A film.

The physical properties of the multi-layered polyethylene film packaging material are shown in Table 3.

Comparative Example 7

A multi-layered polyethylene film packaging material was manufactured in the same manner as that of Example 1 except for using B-3 instead of B-1 of the sealant layer B film.

The physical properties of the multi-layered polyethylene film packaging material are shown in Table 3.

TABLE 1

| | Tensile strength (kg/cm$^2$) | | Elongation at break (%) | | Elongation at break in MD/Elongation at break in TD | Tear strength (g/um) | | Secant elastic modulus (kg/cm$^2$) | | Haze (%) |
|---|---|---|---|---|---|---|---|---|---|---|
| | MD | TD | MD | TD | | MD | TD | MD | TD | |
| Manufacturing Method A-1 | 1948 | 172 | 38 | 1 | 38 | 2.3 | 3.1 | 14360 | 11770 | 7.3 |
| Manufacturing Method A-2 | 2687 | 365 | 21 | 2 | 10.5 | 2.4 | 2.1 | 17260 | 11800 | 7.47 |
| Manufacturing Method A-3 | 2345 | 410 | 28 | 2 | 14 | 0.4 | 4.2 | 17970 | 12750 | 8.21 |
| Manufacturing Method A-4 | 3084 | 416 | 21 | 2 | 10.5 | 0.5 | 3 | 20590 | 13250 | 8.77 |
| Manufacturing Method A-5 | 2634 | 426 | 24 | 3 | 8 | 0.5 | 4.4 | 18510 | 13640 | 8.7 |
| Manufacturing Method A-6 | 1561 | 413 | 48 | 702 | 0.068 | 29.8 | 2.2 | 12260 | 8960 | 6.14 |
| Manufacturing Method A-7 | 2046 | 198 | 27 | 552 | 0.049 | 14.6 | 1.9 | 13100 | 9086 | 5.98 |
| Manufacturing Method A-8 | 3364 | 467 | 24 | 2 | 12 | 0.4 | 5.5 | 21640 | 15840 | 5.7 |
| Manufacturing Method A-9 | 480 | 460 | 680 | 710 | 0.96 | 8.3 | 18.2 | 6750 | 6310 | 45 |

TABLE 2

|  | Tear strength (g/um) MD | Tear strength (g/um) TD | Sealing initiation temperature | Tm difference between surface layer a1 and sealant layer b3 |
|---|---|---|---|---|
| Manufacturing Method B-1 | 0.7 | 5.0 | 90° C. | 45° C. |
| Manufacturing Method B-2 | 2.0 | 9.0 | 90° C. | 45° C. |
| Manufacturing Method B-3 | 11.9 | 21.7 | 110° C. | 20° C. |
| Manufacturing Method B-4 | 14 | 24 | 90° C. | 45° C. |
| Manufacturing Method B-5 | 0.6 | 10.5 | 135° C. | 5° C. |
| Manufacturing Method B-6 | 9 | 18.7 | 110° C. | 20° C. |
| Manufacturing Method B-7 | 11.1 | 24.6 | 130° C. | Lower than 5° C. |

TABLE 3

| | Tensile strength (kg/cm²) MD | Tensile strength (kg/cm²) TD | Elongation at break (%) MD | Elongation at break (%) TD | Tear strength (g/um) MD | Tear strength (g/um) TD | Secant elastic modulus (kg/cm²) MD | Secant elastic modulus (kg/cm²) TD | Lamination method | Sealing workability | Openability |
|---|---|---|---|---|---|---|---|---|---|---|---|
| Example 1 | 1120 | 150 | 30 | 520 | 0.5 | 1.2 | 11770 | 8030 | Dry lamination | Good | Good |
| Example 2 | 860 | 200 | 30 | 810 | 1.3 | 2.9 | 6630 | 5960 | Dry lamination | Good | Good |
| Example 3 | 1200 | 120 | 20 | 600 | 1.1 | 1.5 | 10800 | 8500 | Dry lamination | Good | Good |
| Comparative Example 1 | 900 | 150 | 20 | 540 | 3.5 | 5 | 6400 | 5400 | Dry lamination | Good | Poor |
| Comparative Example 2 | 710 | 180 | 10 | 900 | 30 | 3.1 | 5500 | 4600 | Dry lamination | Good | Poor |
| Comparative Example 3 | 770 | 150 | 8 | 880 | 16 | 0.8 | 6100 | 3800 | Dry lamination | Good | Poor |
| Comparative Example 4 | 420 | 470 | 110 | 100 | 1.1 | 0.9 | 3850 | 3980 | Dry lamination | Good | Good |
| Comparative Example 5 | 1080 | 140 | 25 | 540 | 0.5 | 0.9 | 11200 | 10800 | Dry lamination | Poor | Good |
| Comparative Example 6 | 380 | 360 | 570 | 600 | 7.0 | 13.1 | 4330 | 3920 | Dry lamination | Good | Poor |
| Comparative Example 7 | 1080 | 2210 | 33 | 650 | 5.5 | 18.4 | 6420 | 6120 | Dry lamination | Good | Poor |

As shown in Table 3, in Examples 1 to 3, it could be seen that both the sealing workability and the openability were excellent.

On the other hand, in Comparative Examples 2 and 3, the laminated fabric was stretched well and did not tear easily when opened. In Comparative Example 5, the difference between the melting point of the outermost film a1 of the surface layer A and the melting point of the innermost film b3 of the sealant layer B was lower than 25° C., a sealing window section for manufacturing an actual packaging material was not secured, and as a result, it was difficult to manufacture a final packaging material.

In Comparative Example 6, the openability was not easy because the surface layer A was configured to include an unstretched film.

In Comparative Examples 1 to 3 and Comparative Examples 5 to 7, it could be seen that the openability was significantly poor because the tear strength in the MD or the TD was 3.0 g/um or more.

As set forth above, the present disclosure provides a multi-layered polyethylene film packaging material, and the packaging material is recyclable and does not cause environmental pollution since it is manufactured using a film formed of only a polyethylene single material.

Further, in the multi-layered polyethylene film packaging material according to the present disclosure, mechanical and thermal properties are not significantly deteriorated in comparison to an existing laminated film formed of heterogeneous materials and a packaging material manufactured using the same, such that damage may be minimized during processing and commercialization processes.

Further, in the multi-layered polyethylene film packaging material according to the present disclosure, the surface layer A and the sealant layer B satisfy the tear strength values in the MD or the TD within a certain numerical range and appropriate stiffness numerical values, such that it is possible to provide a packaging material that is easily opened by consumers and has excellent mechanical properties itself.

Further, the multi-layered polyethylene film packaging material according to the present disclosure has excellent durability at a low temperature, and may thus be suitably used in molded articles used at a low temperature, such as an ice pack, a frozen food packaging bag, a frozen food container, a refrigerated food packaging bag, and a refrigerated food container.

Further, the multi-layered polyethylene film packaging material according to the present disclosure may have significantly excellent heat-sealing properties and high-speed bag-making processability even in a low temperature range without damaging the film or deteriorating physical properties of the film.

Hereinabove, although the present disclosure has been described by specific matters and limited exemplary embodiments, they have been provided only for assisting in the entire understanding of the present disclosure. Therefore, the present disclosure is not limited to the exemplary embodiments. Various modifications and changes may be made by those skilled in the art to which the present disclosure pertains from this description.

Therefore, the spirit of the present disclosure should not be limited to the described exemplary embodiments, but the claims and all modifications equal or equivalent to the claims are intended to fall within the spirit of the present disclosure.

What is claimed is:

1. A recyclable multi-layered polyethylene film packaging material comprising a multi-layered polyethylene film C comprising a surface layer A and a sealant layer B which are bonded to each other,
   wherein the surface layer A comprises a single layer or multiple layers and an outermost layer a1 having a melting point of 128° C. or higher,
   the sealant layer B comprises multiple layers and an innermost layer having a melting point of 103° C. or lower,
   one layer of the sealant layer B is a layer in which a first film layer b1 comprises a polyethylene resin composition having a density of 0.900 to 0.940 g/cm³, a second film layer b2 comprises a polyethylene resin composition having a density of 0.925 to 0.970 g/cm³ as another layer of the sealant layer B, and a third film layer b3 comprising a polyolefin resin as the innermost layer of the sealant layer B are laminated,
   an elongation at break of the surface layer A satisfies the following Expression 1, and
   a difference in melting point between the outermost layer a1 of the surface layer A and the innermost layer b3 of the sealant layer B satisfies the following Expression 2:

$$3 \le \frac{\text{Elongation at break (\%) in machine direction } (MD)}{\text{Elongation at break (\%) in transverse direction } (TD)} \le 80 \quad [\text{Expression 1}]$$

$$25° \text{ C.} \le TA - TB \quad [\text{Expression 2}]$$

in Expression 1, each elongation at break is a value measured according to ASTM D-638-03, and in Expression 2, TA is the melting point of the outermost layer a1 of the surface layer A, and TB is the melting point of the innermost layer of the sealant layer B.

2. The recyclable multi-layered polyethylene film packaging material of claim 1, wherein the surface layer A comprises a layer in which a first high-density polyethylene layer a1 as the outermost layer, a linear low-density polyethylene layer or medium-density polyethylene layer a2, and a second high-density polyethylene layer a3 are sequentially laminated.

3. The recyclable multi-layered polyethylene film packaging material of claim 2, wherein an elastic modulus value of the surface layer A is 12,000 kg/cm² or more when measured in the MD by a 2% secant modulus method.

4. The recyclable multi-layered polyethylene film packaging material of claim 1, wherein a tear strength value of the surface layer A is 3.0 g/μm or less in the MD, and a tear strength value of the sealant layer B is 7.0 g/μm or less in the MD.

5. The recyclable multi-layered polyethylene film packaging material of claim 2, wherein the surface layer A further has one or more layers comprising one or more resins of linear low-density polyethylene and medium-density polyethylene, and the resin has a melt index of 0.5 to 1.2 kg/10 min when measured at a load of 2.16 kg and 190° C. according to ASTM D1238.

6. The recyclable multi-layered polyethylene film packaging material of claim 1, wherein one or more layers selected from the single layer and the multiple layers of the surface layer A further comprise a low-density polyethylene resin.

7. The recyclable multi-layered polyethylene film packaging material of claim 2, wherein one or more layers selected from the layers a1, a2, and a3 of the surface layer A further comprise a low-density polyethylene resin.

8. The recyclable multi-layered polyethylene film packaging material of claim 7, wherein each layer of the surface layer A further comprises 0 to 30 wt % of low-density polyethylene.

9. The recyclable multi-layered polyethylene film packaging material of claim 1, wherein a thickness ratio of the first film layer b1, the second film layer b2, and the third film layer b3 in the sealant layer B is 1:0.2 to 10:0.2 to 2.

10. The recyclable multi-layered polyethylene film packaging material of claim 1, wherein the first film layer b1 comprises 0 to less than 50 wt % of a low-density polyethylene resin.

11. The recyclable multi-layered polyethylene film packaging material of claim 1, wherein the second film layer b2 comprises 0 to less than 50 wt % of a low-density polyethylene resin.

12. The recyclable multi-layered polyethylene film packaging material of claim 1, wherein the multi-layered polyethylene film C is laminated by a dry lamination method.

13. The recyclable multi-layered polyethylene film packaging material of claim 1, wherein a total thickness of the film is 30 to 300 μm.

14. The recyclable multi-layered polyethylene film packaging material of claim 1, further comprising one or more blocking layers between the layers of the surface layer A or on a surface of the surface layer A, or between the layers of the sealant layer B or on a surface of the sealant layer B.

15. The recyclable multi-layered polyethylene film packaging material of claim 14, wherein the blocking layer comprises an oxygen permeation blocking layer.

16. The recyclable multi-layered polyethylene film packaging material of claim 2, wherein densities of the first high-density polyethylene layer a1, the linear low-density polyethylene layer or medium-density polyethylene layer a2, and the second high-density polyethylene layer a3 satisfy the following Expression 5:

$$1.00 \le \frac{M1/M2}{M2/M3} \le 1.20 \quad [\text{Expression 5}]$$

in Expression 5, $M_1$ is the density of the first high-density polyethylene layer a1, $M_2$ is the density of the linear low-density polyethylene layer or medium-density polyethylene layer a2, $M_3$ is the density of the second high-density polyethylene layer a3, the density is measured according to ASTM D792, and a unit of the density is g/cm³.

17. A molded article comprising the recyclable multi-layered polyethylene film packaging material of claim 1.

18. A method for reducing greenhouse gas emissions from a multi-layered polyethylene film packaging material, comprising:
   preparing a recyclable multi-layered polyethylene film packaging material comprising a multi-layered polyethylene film C comprising a surface layer A and a sealant layer B which are bonded to each other, wherein the surface layer A comprises a single layer or multiple layers and an outermost layer a1 having a melting point of 128° C. or higher, the sealant layer B comprises multiple layers and an innermost layer having a melting point of 103° C. or lower, one layer of the sealant layer B is a layer in which a first film layer b1 comprises a polyethylene resin composition having a density of 0.900 to 0.940 g/cm³, a second film layer b2 comprises a polyethylene resin composition having a density of 0.925 to 0.970 g/cm³ as another layer of the sealant layer B, and a third film layer b3 comprising a polyolefin resin as the innermost layer of the sealant layer B are laminated, an elongation at break of the surface layer A satisfies the following Expression 1, and a difference in melting point between the outermost layer a1 of the surface layer A and the innermost layer b3 of the sealant layer B satisfies the following Expression 2:

$$3 \leq \frac{\text{Elongation at break (\%) in machine direction}(MD)}{\text{Elongation at break (\%) in transverse direction}(TD)} \leq 80 \quad \text{[Expression 1]}$$

$$25° C. \leq TA - TB \quad \text{[Expression 2]}$$

in Expression 1, each elongation at break is a value measured according to ASTM D-638-03, and in Expression 2, TA is the melting point of the outermost layer a1 of the surface layer A, and TB is the melting point of the innermost layer of the sealant layer B.

* * * * *